United States Patent Office 3,572,346
Patented Mar. 23, 1971

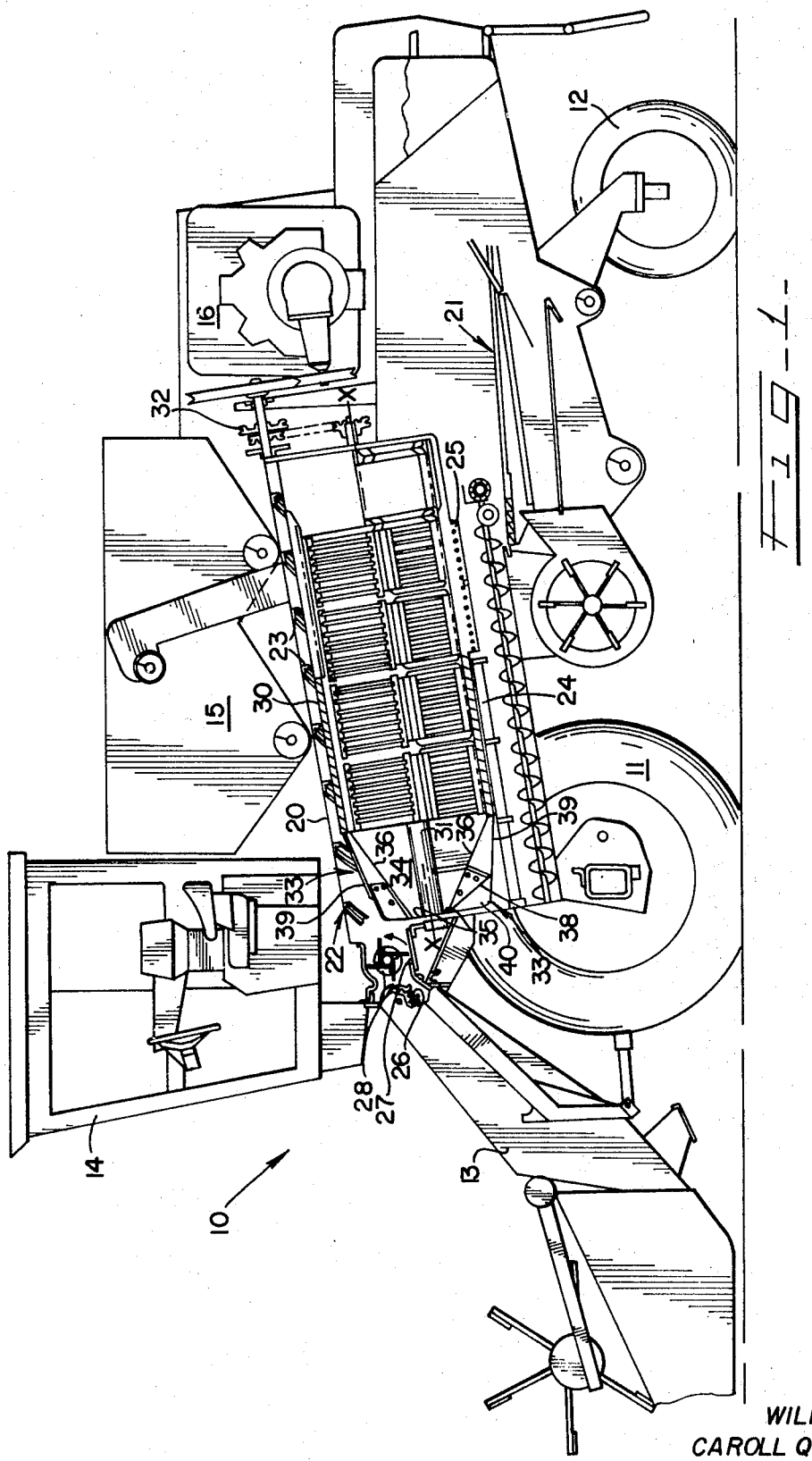

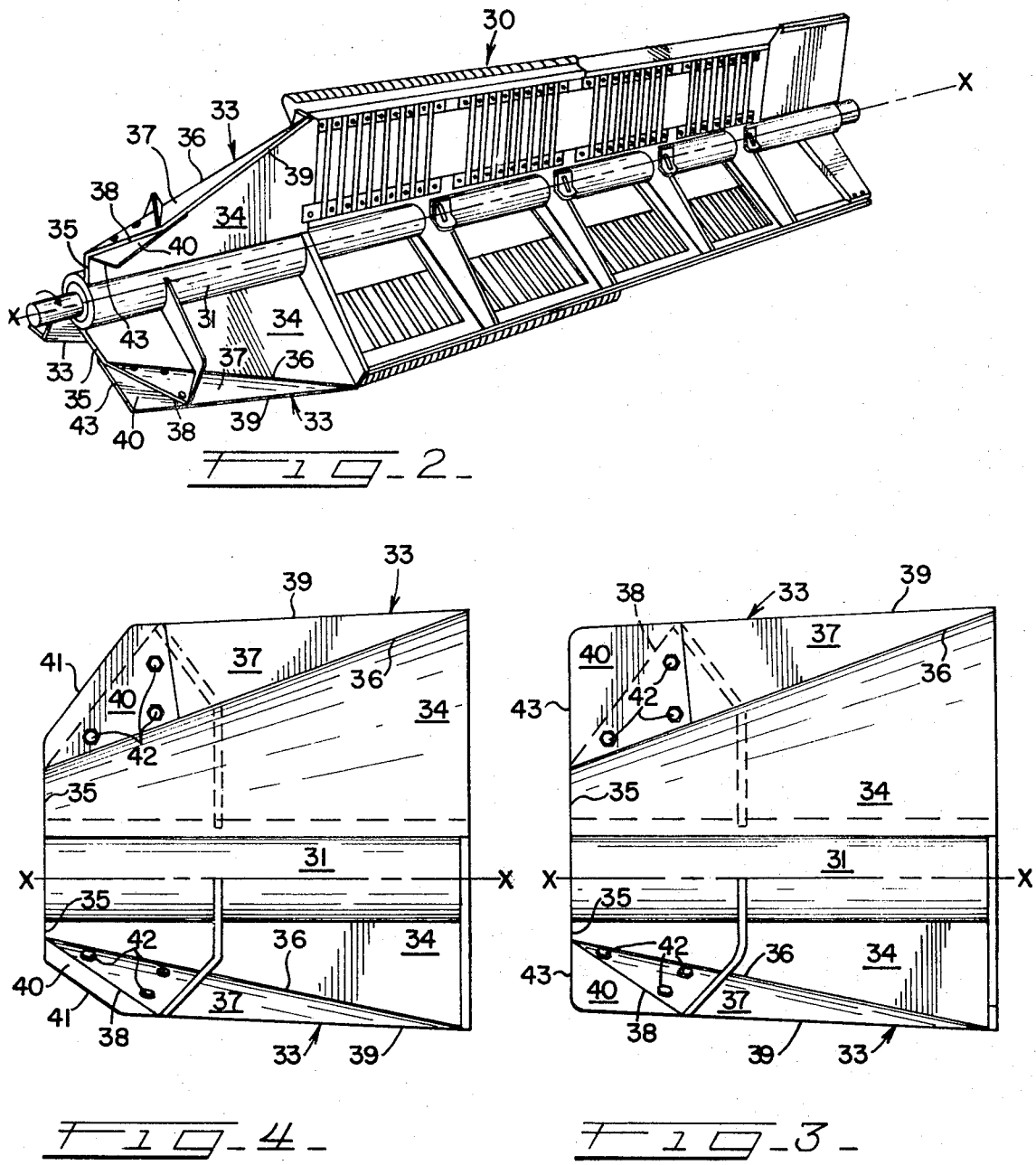

3,572,346
END FEED ARRANGEMENT
William H. Knapp, Davenport, Iowa, and Caroll Q. Gochanour, Moline, Ill., assignors to International Harvester Company, Chicago, Ill.
Filed Oct. 8, 1969, Ser. No. 864,847
Int. Cl. A01f 12/18
U.S. Cl. 130—27                                            9 Claims

ABSTRACT OF THE DISCLOSURE

A threshing machine having an elongated threshing cylinder through which crops are axially fed. A rotor mounted within the threshing cylinder having impeller blades at the grain entry end. The impeller blades having a flat planar portion, a scoop portion including a swept back leading edge, and detachable wear members. A horizontal feed plate located at the grain entry end of the threshing cylinder at an elevation corresponding to the swept back leading edge of the impeller blades.

BACKGROUND OF THE INVENTION

(1) Field of the invention

The present invention relates generally to improvements in combines and the like and more particularly to a new and improved grain entry arrangement for an axial flow combine wherein the impeller blades include bolt-on plates having swept back leading edges for certain conditions or square leading edges for other conditions. The square leading edge is preferable when light feed rates are countered or where it is necessary to more closely control the path of the crop. The feed plate is located above and spaced from the rotor axis thus reducing the likelihood of crops wrapping around the rotor shaft.

(2) Description of the prior art

In most commercially available combines the material to be threshed is fed between a rotary cylinder and a stationary concave in a direction normal to the axis of the rotating cylinder. Much of the grain from the material fed to the cylinder and concave pass through the concave as threshed grain. The remainder of the material is conveyed to the separating components of the combine, which in conventional machines, include reciprocating or oscillating straw racks and chaffer sieves.

This invention concerns a combine that operates on a completely different principle than the above described commercially available combine. In the combine described in the subject patent, an elongated rotor is provided along a longitudinal axis of the combine. The elongated rotor is enclosed within a cylinder having transport fins provided along its internal upper surface and a concave and grate along its lower surface. The material to be threshed is fed into the front end of the cylinder and is fed axially toward the rear as it is being processed by the cooperating elements of the rotor and cylinder. In axial flow combines of this type, the rotor revolves at a high rate of speed and there is a rather small clearance between the rotor and the casing thus making it difficult to introduce material into the casing. The contour of the throat or entrance area of the threshing cylinder and also the shape of the impeller blade carried by the rotor are critical features of this type machine and determine its ability to accept material into the cylinder. Reference may be made to the patent of Knapp et al. No. 3,464,419, issued on Sept. 2, 1969, filed on Oct. 31, 1966 for a complete disclosure of the throat or entrance area of the threshing cylinder. Reference is hereby made to the application of Van Buskirk Ser. No. 741,963, filed on July 2, 1968 for a disclosure of impeller blades carried on the front end of a rotor. It should be noted that in the above referred to Van Buskirk application, the leading edge of the impeller blades are swept back as are one version of the impeller blades disclosed in the subject application. However, in the subject application, provision is made for bolt-on wear plates having either a swept back leading edge or a square leading edge which can be selected in response to the particular crop condition. It should further be noted that in the above referred to Van Buskirk application the horizontal feed plate is located at a lower elevation than is the corresponding feed plate of the subject application. It has been found that by elevating this feed plate, with respect to the axis of the rotor the likelihood of grassy crops wrapping around the rotor shaft at the front bearing is diminished.

SUMMARY

The general purpose of this invention is to provide an axial flow combine which embraces all the advantages of similarly employed axial flow combines and has an improved and more versatile ability to receive material into the threshing cylinder. One of the requirements of a commercially feasible combine is that it must perform acceptably in numerous crops and crop conditions. The subject invention has significantly enhanced the versatility of this machine. To obtain this the present invention contemplates a unique arrangement whereby bolt-on wear plates can be secured to the impeller blades thus providing either a swept back leading edge or a square leading edge. The generally horizontal feed plate is located substantially above the rotor axis to thus diminish the likelihood of grassy crops wrapping around the rotor axis at the front bearing. This arrangement permits the use of an impeller blade having a swept back leading edge for certain crop conditions and the use of an impeller blade having a square leading edge for other crop conditions. It is more difficult to feed material into the cylinder when using a square-edged impeller blade, however, the likelihood of crops wrapping around the rotor axis is diminished. Thus, when harvesting low volume crops, the square leading edge impeller is optimal and when harvesting high volume crops, the swept back leading edge impeller is optimal. Also the square leading edge impeller is optimal in rice, grass and similar crops where is required to more closely control the path of the crop. The swept back leading edge impeller was found to be superior in windrowed grains. The leading edges of the impeller blades are subjected to considerable wear and thus by providing detachable wear plates the leading edge can be replaced without replacing the entire impeller. By elevating the feed surface the amount of grassy crops wrapping around the rotor axis has been diminished considerably. An object of this invention is to increase the capacity of an axial flow combine and to render it more versatile and adaptable to various crop conditions.

BRIEF DESCRIPTION OF THE DRAWINGS

FIG. 1 is a side view of a combine having portions broken away to show the threshing, separating and cleaning components;

FIG. 2 is an isolated view of the rotor;

FIG. 3 is a side view of the impeller blades having one embodiment of wear plates mounted thereon; and FIG. 4 is a side view of the impeller blades having a second embodiment of wear plates mounted thereon.

DESCRIPTION OF THE PREFERRED EMBODIMENT

Referring now to the drawings wherein like reference characters designate like or corresponding parts throughout the several views, there is shown in FIG. 1 a selfpropelled combine designated 10 having drive wheels 11 (only one shown) and rear steerable wheels 12 (only one shown). The combine 10 includes a header 13, an operator's cab 14, a grain tank 15, and an engine 16. The processing portion of the combine 10 includes a tubular casing 20 having a fore and aft axis identified in FIG. 1 as X—X. Unthreshed material is fed into the tubular casing 20 through its forward end 22 and the threshing and separating functions occur within the tubular casing. There are a plurality of transport fins 23 protruding from the upper internal surface of the tubular casing that function to index the material from the forward end 22 rearwardly through the tubular casing. The bottom portion of the tubular casing 20 is made up of a concave 24 and a grate 25 through which the threshed grain passes and is then fed to the cleaning system 21. An elongated rotor 30 having a central hub 31 is mounted within the tubular casing 20 about fore and aft axis X—X. Drive means 32 connect the elongated rotor 30 to the engine 16. A plurality of impeller blades 33 are secured to the forward end of the hub 31.

The header 13 collects the unthreshed crops and conveys it rearwardly and upwardly towards the forward end 22 of the tubular casing 20. The header 13 includes an undershot conveyor 26 that can be seen in FIG. 1. Unthreshed material is fed by the undershot conveyor 26 rearwardly towards a beater 28. There is a generally horizontal feed plate 27 below the beater 28 and these elements cooperate to feed a layer of unthreshed material into the forward end 22 of the tubular casing 20. It should be noted that the generally horizontal feed plate 27 is located a considerable distance above the fore and aft axis X—X of the tubular casing. For a more detailed disclosure of the general operation of an axial flow combine of this type, reference should be made to the above referred to Van Buskirk application Ser. No. 741,963, filed on July 2, 1968.

The elongated rotor 30 disclosed herein has three impeller blades 33 secured to the hub and extending outwardly therefrom. Each impeller 33 includes a flat planar portion 34 that extends axially along the hub of the elongated rotor. Each flat planar portion 34 has a radially extending leading edge 35 and an outer edge 36 that diverges rearwardly with respect to the axis X—X. Each of the impeller blades 33 also includes a scoop portion 37 which extends from the outer edge 36 into the direction of rotation (see arrow in FIG. 2) of the rotor 30. The scoop portion 37 is made up of a generally triangular sheet of material one edge of which corresponds to the outer edge 36 of the flat planar portion, a second edge forms a swept back leading edge 38 and the third edge is identified as the outer edge 39. It should be noted that the impeller blade could be fabricated from several pieces of material or cast as an integral unit. Wear members 40 are detachably connected to the scoop portions 37 by means such as nuts and bolts 42.

In FIGS. 1, 2, and 3, one embodiment of the wear members 40 is illustrated. In this embodiment each wear member 40 has a blunt leading edge 43 that, when mounted on the impeller blade, lies within a plane normal to the fore and aft axis X—X. Thus, when this wear member 40 is secured to the scoop portion 37, the impeller blade has a leading edge comprised of the radially extending leading edge 35 and the blunt leading edge 43 both of which lie in a plane substantially normal to the fore and aft axis.

In FIG. 4, another embodiment of the wear members 40 is illustrated. In this embodiment each wear member 40 has a blunt leading edge 41 that, when mounted on the impeller blade are swept back, but located forward of the swept back edges 38.

It should be noted that in FIG. 1 the flat planar portion 34 of the upper impeller blade 33 lies within the plane of the drawing and it is apparent in this drawing that the intersection between the radially extending leading edge 35 and the outer edge 36 is at a point below the generally horizontal feed plate 27. Thus, the unthreshed material is exposed to the leading edge of the scoop portion of the impeller at a point spaced from the fore and aft axis X—X thus reducing the likelihood of material wrapping around the forward end of the rotor hub.

It should be understood, of course, that the foregoing disclosure relates to only preferred embodiments of the invention and that numerous modifications or alterations may be made therein.

What is claimed is:

1. In an axial flow combine of the type having a tubular casing formed about a fore and aft axis and having a forward end through which unthreshed material is received, an elongated rotor having a hub journaled for rotation about said fore and aft axis within said casing, means for driving said rotor in a given direction, said hub having a forward end corresponding to the forward end of said tubular casing, impeller blades secured to the forward end of said hub, each impeller blade including a flat planar portion extending axially of said elongated rotor, and a scoop portion extending from said flat planar portion in said given direction, the leading edges of said impeller blades including swept back edges of said scoop portions, and wherein the invention comprises:

wear members having a blunt leading edge, means for detachably connecting a wear member to each of said scoop portions such that said blunt leading edges are forward of said swept back edges.

2. The invention as set forth in claim 1 wherein said blunt leading edges are swept back with respect to said hub.

3. The invention as set forth in claim 1 wherein said blunt leading edges lie in planes that are normal to said fore and aft axis.

4. In an axial flow combine having a tubular casing formed about a fore and aft axis, said tubular casing having a forward end through which unthreshed material is received, an elongated rotor having a hub journaled for rotation about said fore and aft axis within said casing, means for driving said rotor in a given direction, said hub having a forward end corresponding to the forward end of said tubular casing, and impeller blades secured to the forward end of said hub;

each impeller blade including:
a flat planar portion extending axially of said elongated rotor, said flat planar portion having a radially extending leading edge and an outer edge diverging rearwardly with respect to said axis,
a scoop portion joined to said flat planar portion along said outer edge and protruding into said given direction, said scoop portion including a swept back edge that intersects with said radially extending leading edge,
a wear member having a blunt leading edge, and
means for detachable connecting said wear members to said scoop portions such that said blunt leading edges are forward of said swept back edges.

5. The invention as set forth in claim 4 wherein said blunt leading edges are swept back with respect to said hub.

6. The invention as set forth in claim 4 wherein said blunt leading edges lie in planes that are normal to said fore and aft axis.

7. In an axial flow combine having a tubular casing formed about a fore and aft axis, said tubular casing having a forward end through which unthreshed material is received, an elongated rotor having a hub journaled for rotation about said fore and aft axis within said casing, said hub having a forward end corresponding to the forward end of said tubular casing, impeller blades secured to the forward end of said hub, means for driving said rotor in a given direction, a generally horizontal feed plate forward of said tubular casing at an elevation above said fore and aft axis;

each impeller blade including:
a flat planar portion extending axially of said elongated rotor, said flat planar portions having radially extending leading edges terminating at a point below said horizontal feed plate and an outer edge diverging rearwardly with respect to said axis,
a scoop portion joined to said flat planar portion along said outer edge and protruding into said given direction, said scoop portion including a swept back edge that intersects with said radially extending leading edge,
a wear member having a blunt leading edge, and
means for detachable connecting said wear members to said scoop portions such that said blunt leading edges are forward of said swept back edges.

8. The invention as set forth in claim 7 wherein said blunt leading edges are swept back with respect to said hub.

9. The invention as set forth in claim 7 wherein said blunt leading edges lie in planes normal to said fore and aft axis.

References Cited
UNITED STATES PATENTS 2,053,148  9/1936  James  130—27.17
3,464,419  9/1969  Knapp et al.  56—21

ANTONIO F. GUIDA, Primary Examiner